No. 623,775. Patented Apr. 25, 1899.
J. FEY.
GRAIN MEASURE.
(Application filed Feb. 27, 1899.)
(No Model.)
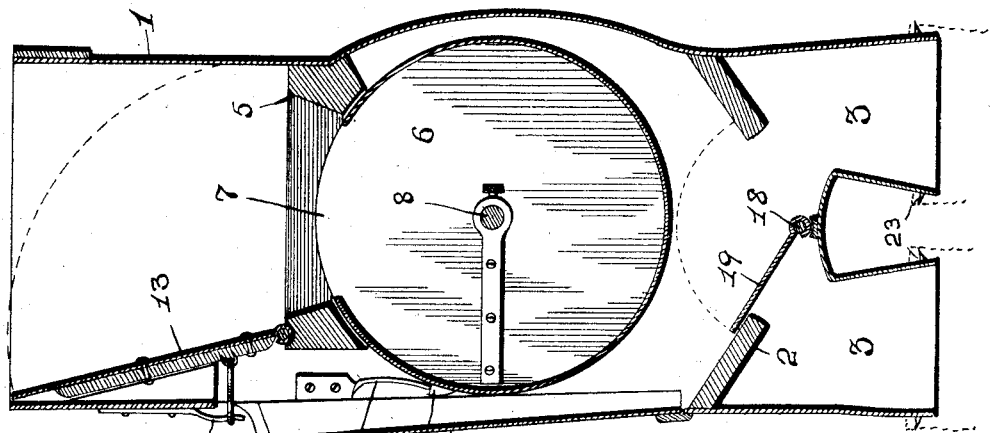
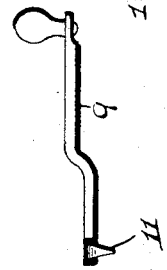
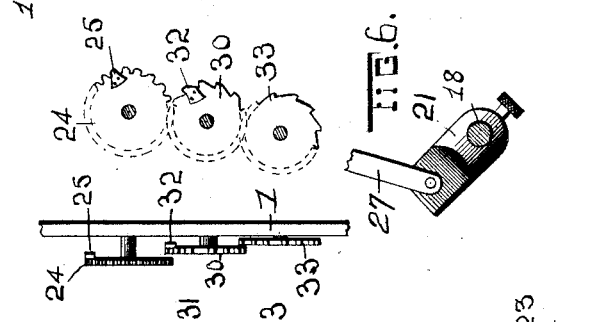
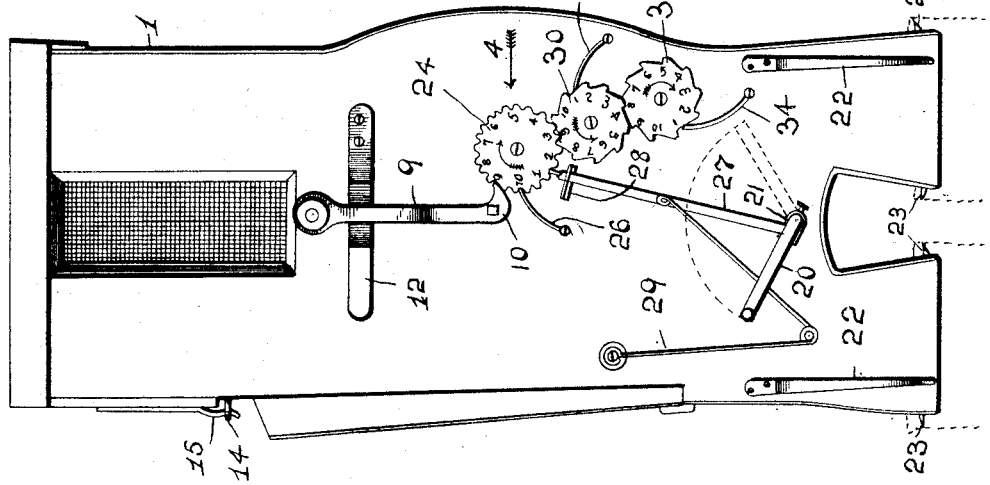
Attest
A. J. McCauley.
M. F. Smith.
Inventor:—
Julius Fey,
By Higdon & Longan,
Atty's.

UNITED STATES PATENT OFFICE.

JULIUS FEY, OF WELDON SPRING, MISSOURI.

GRAIN-MEASURE.

SPECIFICATION forming part of Letters Patent No. 623,775, dated April 25, 1899.

Application filed February 27, 1899. Serial No. 707,055. (No model.)

*To all whom it may concern:*

Be it known that I, JULIUS FEY, of the city of Weldon Spring, St. Charles county, State of Missouri, have invented certain new and useful Improvements in Grain-Measures, of which the following is a full, clear, and exact description, reference being had to the accompanying drawings, forming a part thereof.

My invention relates to grain-measures; and it consists of the novel construction, combination, and arrangement of parts hereinafter described and claimed.

Figure 1 is a side elevation of my improved grain-measure. Fig. 2 is a vertical sectional view taken through the center of the measure. Fig. 3 is a plan view of a specially-formed crank used in my improved measure. Fig. 4 is an edge view of the ratchet-wheels seen looking in the direction indicated by the arrow 4, Fig. 1. Fig. 5 is a rear elevation of the ratchet-wheels. Fig. 6 is a detail sectional view showing the eccentrically-pivoted lower end of a pawl that actuates the first one of the ratchet-wheels.

In the construction of my improved measure a vertically-arranged rectangular casing 1 is constructed with a hopper 2 in its lower portion, immediately below which hopper 2 is formed a pair of discharge-spouts 3.

Formed on one side of the casing 1 and projecting laterally therefrom is a chute 4, the lower end thereof discharging onto one side of the hopper 2. Arranged within the casing 1, at a point above the center thereof, is a hopper 5, there being a slight space left between the side of this hopper and the upper end of the chute 4. Rotatably arranged within the center of the casing 1 and immediately below the hopper 5 is a hollow cylindrical drum 6, the same performing the function of a measuring-receptacle, there being a single opening 7 formed in the periphery of said drum, which opening is equal in size to the discharge end of the hopper 5. This measuring receptacle or drum is constructed to hold a certain amount of grain—for instance, a peck, half-bushel, or bushel. Removably fixed upon the end of the shaft 8, on which said drum is carried, and which shaft projects outwardly a short distance from the side of the casing 1, is a crank-handle 9, the lower end 10 of which is bent laterally and provided with the rearwardly-projecting pin 11. A leaf-spring 12 is secured at one end outside of the casing 1, at a point behind this handle 9, and the free end of said leaf-spring frictionally engages the upper end of said handle and is designed to hold said handle in a vertical position or when the aperture or opening 7 of the drum is in coincidence with the discharge end of the hopper 5.

13 indicates a gate which is pivoted to the upper edge of the hopper 5, that is adjacent the upper end of the chute 4, said gate being arranged to swing over the mouth of the hopper 5, as indicated by dotted lines in Fig. 2. This gate 13 carries a link 14, which is intended to engage the lower end of a finger 15, that is fixed to the outer side of the casing 1, immediately above the top of the chute 4.

Arranged upon the periphery of the drum 6 and adjacent one side thereof is a lug 16, and fixed to the inner face of one side of the casing 1 is a leaf-spring 17, the end of which is intended to engage against said lug 16 when the measuring-receptacle is receiving the grain through the hopper 5, and said spring prevents a reverse movement of the drum or measuring-receptacle.

Rotatably arranged in the lower portion of the casing 1 and immediately above the discharge-spouts 3 thereof is a shaft 18, on which is carried a gate 19, the same swinging as indicated by dotted lines in Fig. 2 and being adapted to cause the grain to pass from the hopper 2 into either one of the discharge-spouts 3. The outer end of this shaft 18 is formed into a crank-handle 20, and fixed upon said shaft 18 adjacent the side of the casing 1 is a short arm 21.

Fixed to the sides of the casing 1 on the spouts 3 thereof are the upper ends of leaf-springs 22, the lower ends of which engage against the lower ends of the spouts 3, and extending outwardly from the sides of said spouts 3 are the attenuated pins 23. The bags which receive the grain are held upon the spouts 3 by these pins and springs.

Held to rotate upon the side of the casing 1 at a point to one side of and just below the shaft 8 is a ratchet-wheel 24, the same being provided with twenty teeth, and the notches between said teeth are alternately numbered in succession from "1" to "10," and carried by the rear side of said ratchet-wheel 24 and projecting into the plane occupied by the teeth thereof is a single lug 25. This ratchet-wheel 24 is so arranged relative the rearwardly-extending point 11 of the crank-handle 9 as that when said crank-handle is rotated said point 11 will engage between the teeth of said ratchet-wheel and move the same to a distance of two teeth or notches, which is one-tenth of its revolution. A spring-detent 26 is arranged upon the casing 1 in such a manner as that its point engages between the teeth of the ratchet-wheel 24 and prevents a reverse movement thereof.

Pivotally held to the outer end of the arm 21 is a vertically-arranged bar 27, the upper end of which passes through a retaining-strip 28, and said upper end engages between the teeth of the ratchet-wheel 24. A V-shaped spring 29 has one end secured to the casing 1, its opposite end engaging against the bar 27.

Held to rotate upon a pin immediately below the ratchet-wheel 24 is a ratchet-wheel 30, the same having ten teeth formed in its periphery and said teeth being so formed as to be engaged by the lug 25, carried by the ratchet-wheel 24. These teeth are numbered consecutively from "1" to "10," and a spring-pawl 31 is arranged to engage behind the teeth of this ratchet-wheel 30 to prevent a reverse movement of said wheel. Formed on or fixed to the rear side of this ratchet-wheel 30 is a lug 32. Held to rotate a short distance below the ratchet-wheel 30 is a third ratchet-wheel 33, the periphery of which is provided with ten teeth numbered consecutively from "1" to "10," and which teeth are constructed to be engaged by the lug 32, carried by the ratchet-wheel 30, and a spring-pawl 34 is arranged to engage behind the teeth of said ratchet-wheel to prevent a reverse movement of said wheel.

The operation of my improved measure is as follows: The shaft 8 is so rotated as that the opening 7 in the measuring-receptacle is brought into coincidence with the discharge-opening of the hopper 5, and the grain passing into the measure will pass downwardly through the upper end thereof, through the hopper 5, and into the drum or measuring-receptacle. When said drum becomes filled and it is desired to discharge the same into the sack held upon the lower end of the discharge-spout 3, through which the grain is arranged to discharge by the proper positioning of the gate 19, the operator manually engages the crank-handle 9 and gives the same a half-turn, and by so doing the opening 7 in the periphery of the drum is brought into a position immediately above the hopper 2, and the grain carried by the measuring drum or receptacle discharges out of the same into the hopper 2, and from thence over the gate 19, through the discharge-spout 3, and into the sack. As soon as the grain has discharged from the drum the operator continues the rotation of the crank-handle 9, bringing the same into a vertical position, and by so doing causes the opening 7 in the periphery of said drum to again coincide with the discharge end of the hopper 5. The grain that has been discharged into the upper end of the measure during the rotation of the drum will be held in the hopper 5 for the reason that the periphery of said drum operates closely against the lower end of said hopper 5 and forms a bottom upon which the incoming grain lodges during the rotation of the crank-handle 9. The point 11, carried thereby, engages between the teeth of the ratchet-wheel 24 and moves the same one tooth or notch.

In the construction of the device as shown the drum is supposed to hold a half-bushel, and the ratchet-wheel 24 is numbered correspondingly. Consequently with the rotation of the drum and handle a half-bushel of grain is measured and delivered into the sack, and when the ratchet-wheel 24 has made a complete revolution ten bushels of grain will have been measured, and when the twentieth half-bushel is measured the lug 25, carried by the ratchet-wheel 24, will engage against one of the teeth of the ratchet-wheel 30 and the same will be moved one notch. When the ratchet-wheel 30 has made one complete revolution, it will indicate that one hundred bushels of grain have been measured, and when the ratchet-wheel 33 has made one complete revolution it will indicate that one thousand bushels of grain have been measured.

At any time during the operation of the measure the operator can glance at the numbers on the tops of the three ratchet-wheels and instantly ascertain the exact number of bushels and half-bushels that have been measured.

The lug 32, carried by the ratchet-wheel 30, engages between the teeth of the ratchet-wheel 33 once during each rotation of said ratchet-wheel 30, and, as heretofore stated, the spring-pawls 26, 31, and 34 prevent a reverse movement of the various ratchet-wheels.

Should it be desired to measure the grain by sacks, the gate 13 is thrown downwardly over the hopper 5, as indicated by dotted lines in Fig. 2, and the grain passing into the measure will strike against said gate and be deflected thereby into and through the chute 4 and from thence downwardly through the discharge-spouts 3. The bags are located alternately upon the lower ends of said spouts, and as the bags are alternately filled the crank-handle 20 is actuated from one position to another, and at each actuation the gate 19 is swung as indicated by dotted lines in Fig. 2, and the bar 27 is elevated at each actuation by said crank-handle, and the point carried by the upper end of said bar engages between the teeth of the ratchet-wheel 24 and moves the same one notch.

A grain-measure of my improved construction is simple, strong, and durable, easily operated, is very accurate in measurement, can be instantly transformed so as to measure by bushels or by sacks, and the measure will work advantageously with any kind of grain and under any circumstances.

I claim—

In a grain-measure, a vertically-arranged casing, a hopper within the upper end of said casing, a vertically-arranged chute integral with one side of the casing and leading downwardly from said hopper, a gate pivoted to one side of the hopper in such a manner as to cause the incoming grain to discharge either in the hopper or chute, a measuring-receptacle arranged immediately beneath the hopper, means whereby said measuring-receptacle is rotated from the exterior of the casing, registering mechanism arranged to be actuated at each rotation of the receptacle, a hopper arranged immediately beneath the receptacle, a pair of discharge-spouts at the lower end of the casing below said last-mentioned hopper, bag-retaining devices upon said spouts, a gate mounted to swing between said spouts and to cause the grain to pass through either one of said spouts, and means whereby the registering mechanism is actuated at each movement of said gate, substantially as specified.

In testimony whereof I affix my signature in presence of two witnesses.

JULIUS FEY.

Witnesses:
   CHAS. W. BLOCK,
   M. P. SMITH.